United States Patent [19]
Lecuyer et al.

[11] 4,087,692
[45] May 2, 1978

[54] RADIAMETER

[75] Inventors: Pierre Leon Denis Lecuyer; François Crousillac, both of Boulogne, France

[73] Assignee: Le Material Telephonique, Boulogne-Billancourt, France

[21] Appl. No.: 744,044

[22] Filed: Nov. 22, 1976

[51] Int. Cl.² .............................................. G01T 1/22
[52] U.S. Cl. ................................................. 250/370
[58] Field of Search ....................... 250/370, 371, 336

[56] References Cited

U.S. PATENT DOCUMENTS 3,829,697  8/1974  Koehler ................................ 250/370

Primary Examiner—Davis L. Willis
Attorney, Agent, or Firm—Roland Plottel

[57] ABSTRACT

Apparatus for measuring atomic radiation includes a plurality of solid-state detectors, typically connected in parallel, each detector being selected such that the parallel combination has a desired response characteristic. The detectors are connected to the input of a pre-amplifier/integrator which, in turn, drives a counter via a trigger circuit. The detectors, trigger circuit and pre-amplifier/integrator may advantageously be combined on a single integrated circuit chip.

9 Claims, 2 Drawing Figures

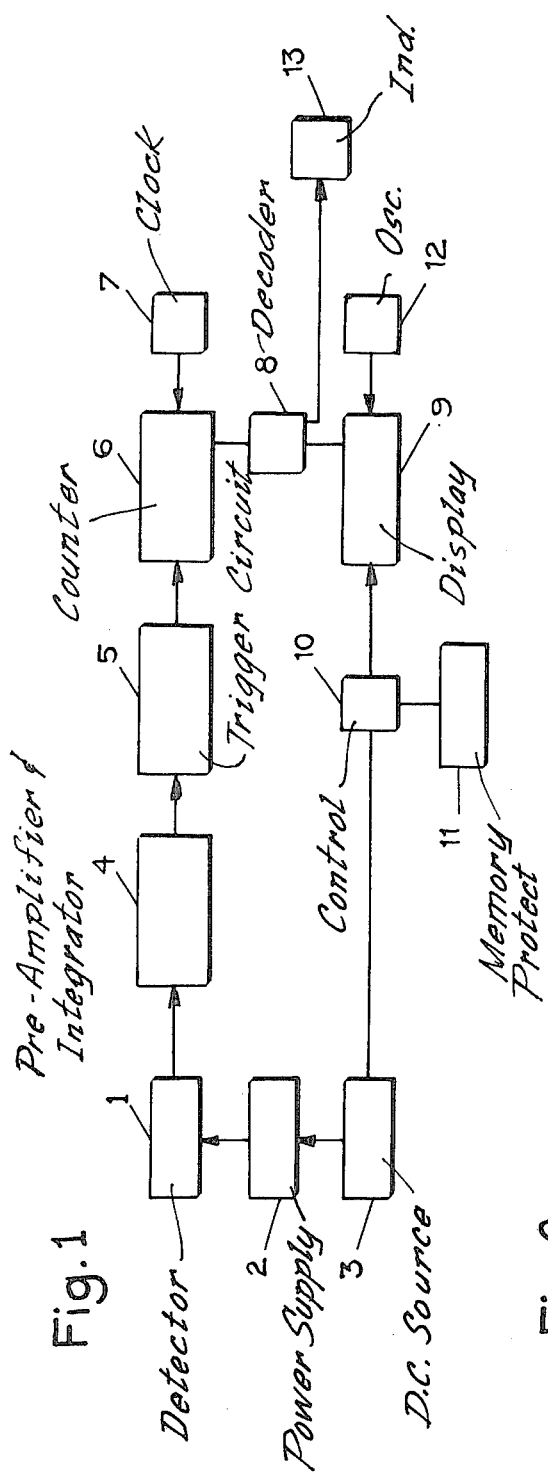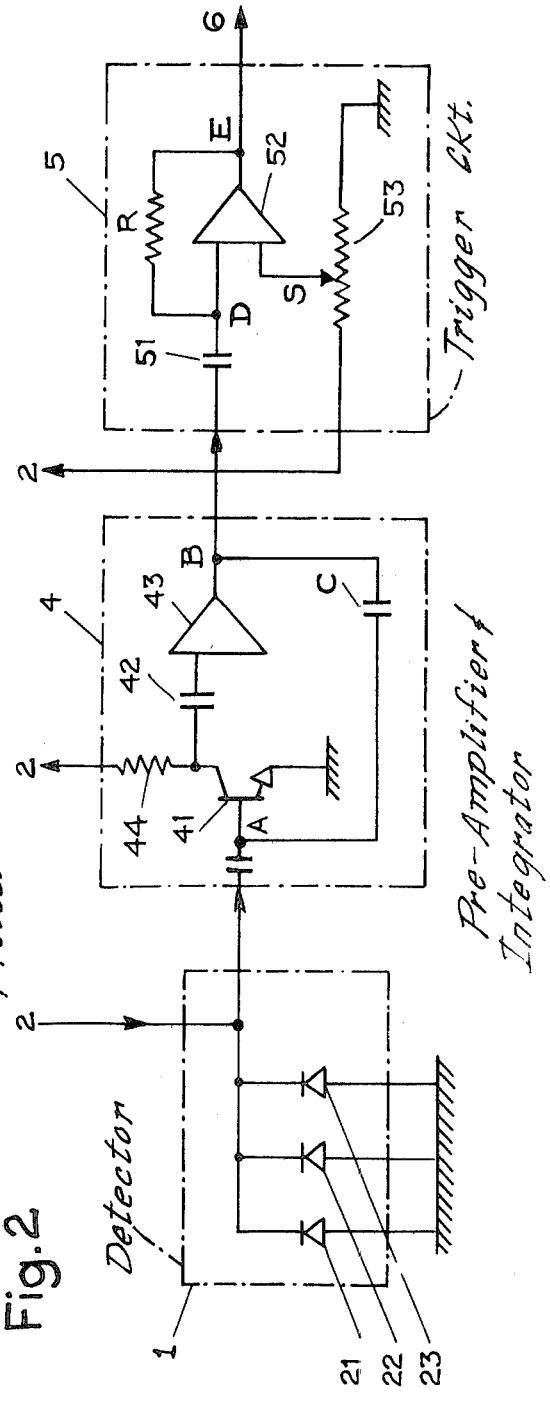

RADIAMETER

The present invention relates to devices for measuring atomic radiation, in particular those for measuring ambient radioactivity levels.

These devices are commonly known as radiameters.

There are two kinds of radiameters, depending on the required purpose. In the case of precision radiameters, used for physical measurements, high-accuracy performance characteristics are required. In the case of radiameters for safety reasons, the required accuracy is less. The latter devices, which are mainly used for ensuring the safety of personnel required to work in an environment normally subjected to radioactive radiation, must be highly reliable and small in size. The permanent carriage and reading of these equipments by users should be facilitated.

Until now, producers of radiameters have mainly concentrated their efforts in making precision equipment, this being a radiameter in which the element sensitive to the radiation to be measured is either a GEIGER-MULLER counter or an ionization chamber, or again a solid-state detection cell. These equipments are large in size and their cost is high.

Over the last twenty years, solid-state detection cells have been developed for this application, these cells being of crystalline structure which is either homogeneous or a junction element whose substrate is of germanium, silicon or compounds such as cadmium telluride, gallium arsenide, mercury iodide and many others.

Detection devices in which the basic sensor is a semiconductor has considerable advantage over other known detectors with regard to size. Considerable progress has been made in the technology of these devices. In particular, it is now possible to obtain from one or another of these solid-state detectors a usable signal for very low radiation levels.

In addition, the circuits for processing the signal produced by a solid-state detector are well known. They consist in acquiring the signal produced by the semiconductor or semiconductor junction and in integrating this signal in a circuit commonly known as a "charging/integrating preamplifier" or, more briefly, simply "preamplifier".

The quantity of Q of ionized charge is proportional to the electric field developed in the semiconductor or junction, but the signal produced is an electron current proportional to the differential of the quantity of charge $dQ/dt$. In order to obtain a signal proportional to the quantity Q of ionized charge, it is necessary to integrate this signal. Since the quantities of charge are extremely small, e.g. some $10^{-14}$ coulombs, the current itself is low and it is also necessary to amplify it. A single circuit known as the charge preamplifier performs the double function of integration and amplification of the received signal.

The signal voltage on the output of this circuit is normally fed to at least one and often several additional amplification stages in order to increase its level. When the signal has been sufficiently amplified for use, it is fed to a monostable circuit producing an output pulse for a given input signal level.

The monostable drives a counter, which counts the pulses received. The resulting count can be stored in a memory circuit. It can also be used in a readout in order to provide a visual indication, or it can also be used for operating a printer.

For most operating modes, a decoder must be placed between the counter and indicator.

Today's current production of circuits, even highly complex, in a compact form, such as solid-state integrated circuits, functional devices based on LSI, MOS and hybrid techniques, etc., enables a sequence of complex functional circuits to be produced with very low weight and size.

In order to meet the requirements of users exposed to radioactive radiation, making use of the latest technical developments in both detectors and circuits, the purpose of the present invention is to provide a process and an equipment for measuring ambient radioactivity with good accuracy by means of an extremely small-size equipment.

According to the invention, the process consists in exposing a detector to the effects of radioactive radiation, the detector comprizing at least one solid-state detector, acquiring the signal produced, integrating this signal in a charge preamplifier in order to obtain a voltage proportional to the charge produced by the incident radiation, using the said voltage for triggering a threshold circuit when the said tension reaches a value exceeding a predetermined value, counting, memorizing, and even displaying or printing out the resulting count, the process being characterized by the fact that the detector comprizes a plurality of dissimilar detectors which, after a selection to provide spectral sensitivity compensation, are simultaneously exposed to the radiation and are electrically associated to cooperate in producing a spectral sensitivity response signal, independent of the incident radiation spectrum, and by the fact that the said signal is used for directly triggering the threshold circuit after passing through the preamplifier-/integrator, and by the fact that means are provided for correcting the sensitivity dispersion of the said detectors as a function of the type of incident radiation and its energy level, in order to produce a response whose sensitivity is independent or virtually independent of the incident energy.

According to the invention, the means by which the overall response of the detector is provided with a constant-sensitivity characteristic consist in associating detectors possessing different spectral responses in order to provide compensation between their individual sensitivity differences due either to their internal nature or to their environment, such as screening.

According to the invention, the measuring process provides the means of imparting uniform accuracy to the information it produces. According to the invention, the means for maintaining uniform accuracy of the signals acquired consist in providing a cumulative count independent of the counting time, i.e. to perform a count uniformly limited to a constant number of pulses or events counted.

Another purpose of the invention is to provide an apparatus for implementing the process mentioned above.

According to the invention, the device consists of a detection unit, a charge preamplifier, a trigger circuit with a predetermined threshold level, a counting and memorization unit, together with, if required, a display of printout unit. According to one of its characteristics, the detectors are associated in a parallel configuration. Another practical variant according to the invention consists of parallel groups, each possessing a detection unit, a charge preamplifier and a trigger circuit.

According to another characteristic the device possesses in one of its practical variants at least one detector consisting of a homogeneous semiconductor.

According to another practical configuration, the device possesses at least one detector of the semiconductor junction type.

According to another practical configuration, the device possesses at least one semiconductor junction detector of the usual type.

According to another characteristic, the equipment possesses at least one semiconductor junction detector of the non-encapsulated type, known as a "chip".

According to another characteristic, the device possesses at least two groups connected in parallel, each comprising a detection unit, a charge preamplifier and a trigger circuit, in which the components are homogeneous semiconductors and junction semi-conductors.

According to another practical configuration, the device possesses at least two groups connected in parallel, in which the detectors are junction detectors having different characteristics.

According to another practical configuration, the equipment possesses junction detectors, whose characteristics are dissimilar. These dissimilarities may comprise, for example, different semiconductor materials, different semiconductor doping, different junction thickness, etc. The detectors may be diversified by the choice of their supply and bias voltages. They can again be diversified by the individual environments in which they are located, in particular by the screening surrounding them. They may also differ one from another by their individual operating characteristics.

Since it is also possible to provide parallel groups, each possessing a detection unit, a charge preamplifier and a trigger circuit, i.e. the elements illustrated by the functional blocks 1, 4 and 5, it is also possible to differentiate between groups by diversifying their individual trigger threshold levels.

In a practical device possessing a plurality of parallel groups or channels, the device thus possesses at least two parallel groups or channels of different compositions.

The purposes and characteristics of the present invention are made clearer by reading the following description of practical examples, the said description referring to the appended drawings in which:

FIG. 1 is a block diagram illustrating the method of measurement according to the invention.

FIG. 2 illustrates the principle of the circuits in the detection, integration and trigger units.

In FIG. 1, block 1 is the detection unit, block 2 provides its supply and bias voltages, block 3 is the DC source, block 4 is the preamplifier/integrator, block 5 is the trigger circuit, block 6 is the counter, block 7 is the time base, block 8 is the decoder, block 9 is the display, block 10 controls source 3, block 11 controls the memory protection, and block 12 is an oscillator providing permanent readout. Block 13 represents an indicator to warn the user that the tolerable radioactivity level has been exceeded, as soon as this occurs.

The principles of measuring radioactive radiation from the signal produced by a semiconductor detector have been described in the technical literature.

In particular, it is useful to refer to "ELECTRONIQUE" by Robert Guillien (1961) P.U.F., Volume III, pages 342 et seq., and to "SEMICONDUCTOR COUNTERS FOR NUCLEAR RADIATIONS" by G. Dearnaley and D. C. Northrop (1963), E. & F. N. Spon Limited, London. As stated in these references, these semiconductor detectors are sensitive to ionizing radiation including, but not limited to, high energy radiation such as gamma radiation and neutron radiation.

The signal obtained from one of these detectors is proportional to $dQ/dt$. This signal must be integrated to make it proportional to Q, and amplified to make it usable, because of the low level of the electric charges released.

These two operations are performed by the preamplifier/integrator 4.

In the case of conventional use of a semiconductor detector, the signal obtained from a normal charge preamplifier is still unusable as such. It is therefore customary to provide at least a second if not several intermediate amplification stages following the preamplifier before using the signal in a trigger or monostable circuit for generating a pulse for a given input voltage level.

According to the process described by the invention, these intermediate amplification stages are avoided. In the detection unit, several low-noise detectors such as detectors 21, 22 and 23 seen in FIG. 2 are connected in parallel, providing the diagram of the circuits of blocks 1, 4 and 5 in FIG. 1. The charge preamplifier 4 possessing a negative feedback circuit BCA consists of a bipolar transistor 41, an amplifier 43 and a resistor 44. Capacitor 42 is a decoupling capacitor.

The input signal is integrated by the charge preamplifier possessing the negative feedback circuit BCA. The use of a bipolar transistor provides high input impedance. Amplifier 43 has very high gain. The supply voltage to transistor 41 is obtained from the supply 2 via resistor 44.

The signal obtained on the output of preamplifier 4 is fed to the trigger unit 5 to drive amplifier 52 possessing the negative feedback circuit ERD. The triggering level is determined by a variable voltage S from an adjustable resistor 53 fed from supply 2. Circuit 5 converts the received signal into a series of pulses, each pulse being produced when the signal exceeds the value defined by the threshold level.

According to the invention, the detectors are selected either encapsulated or bare (chips) with or without screening before they are placed in the detection unit. The selection is such as to compensate for the individual spectral responses.

A selection may also be made as a function of the trigger threshold levels in the case of parallel groups or channels.

The pulses on the output of trigger circuit 5 are fed to the counting unit, which may consist of conventional counters. The pulses are counted at this stage.

According to the invention, in order to maintain constant count accuracy, the counts are not performed during a given time interval, but up to a constant number of pulses.

The time reference necessary for making the counts significative is provided by time-base 7.

The data are memorized in a known manner, which need not be described. The memorization unit is not shown in FIG. 1.

Similarly, display means illustrated by block 9 are provided. The display can be provided by liquid crystals or electroluminescent diodes. The luminosity of the liquid crystals is maintained as shown in FIG. 1 by the 12 to 30 Hz oscillator.

According to one practical variant, the device is divided into two distinct parts:

a first reception device consisting of the detection unit 1, preamplification unit 4, trigger unit 5, counter 6, decoding unit 8, time-base 7, their power supplies 2 and 3, and their ancillary circuits 10 and 11. This first device is then completed by a memorization unit which is not shown in the figure. This memorization unit is used as a data store.

a second device, known as the reader, reads the data produced by the first device. It includes the readout unit 9 and its accessories: printer or other devices, etc.

It is thus possible to produce a first device, which is simply the receiver, commonly known as a blind dosimeter. It has the advantage of extremely small size and low weight. When enclosed in a suitable case, it may weigh only a few grammes and need not be larger than a match-box. It is then merely necessary to read this small-size device by means of the second device in order to decipher the data it has acquired.

The polyvalent nature of the device according to the invention provides it with many advantages, including in particular extremely simple operation, fast response, suitable for measuring very wide ranges of radioactivity levels, simple power supplies (for semiconductors with high reverse voltages, requiring only low supply voltages), a wide range of usable detectors, etc.

Several additional features are possible, such as memory protection in the event of battery voltage drop, battery voltage drop indication, the possibility of providing a manual read control position for instantaneous reading, and the triggering of a signal if the tolerable radiation level for a human person is exceeded, which can be easily provided by block 13 controlled by decoder 8 by means of a trigger circuit of known arrangement.

All these facilities, together with others not mentioned herein, can be obtained by known practical means and can be added to the device by a person versed in the art without exceeding the scope of the invention.

Although the principles of the present invention are described above in relation with specific practical examples, it should be clearly understood that the said description is given as an example only and does not limit the scope of the invention.

We claim:

1. Improved apparatus for measuring radioactive radiation, said apparatus being of a type that comprises: a detection circuit including at least one solid-stage detector; a pre-amplifier circuit for integrating the output of said detection circuit thereby to obtain a voltage which is proportional to the electrical charges which are released by the ionization which occurs within said at least one detector as a result of said radiation; a trigger circuit connected to said pre-amplifier circuit for generating a pulse each time that said voltage exceeds a given threshold level; means for counting said pulses; and means for displaying said count, wherein the improvement comprises:

a plurality of dissimilar detectors in said detection circuit, said detectors being electrically associated to provide an overall response which compensates for the individual response of each detector and which results in a sensitivity which is independent of the spectrum of the incident radiation; and means for directly connecting the output of said pre-amplifier circuit to the input of said trigger circuit.

2. The apparatus according to claim 1 wherein each of said plurality of detectors differs from the other by at least one of the following factors — spectral response characteristic; supply and bias voltage; and external screening, said electrical association comprising connecting said detectors in parallel.

3. The apparatus according to claim 1 wherein said apparatus includes at least two parallel channels each comprising at least a detection circuit, a pre-amplifier circuit, and a trigger circuit.

4. The apparatus according to claim 3 wherein each of said channels differs from the other in terms of:
   a. the spectral response characteristic; supply and bias voltage; and, external environment, such as screening, of the detectors; and
   b. the threshold of the trigger circuit, the selection of the aforementioned characteristics being made to obtain optimum compensation of the individual response of each of said channels, said channels being connected in parallel.

5. The apparatus according to claim 4 wherein said pre-amplifier, trigger circuit and counting means are fabricated on an integrated circuit, said integrated circuit including the pre-amplifier, trigger circuit and counting means for said at least two parallel channels.

6. The apparatus according to claim 4 wherein the detectors in each detection circuit comprise homogeneous semiconductors.

7. The apparatus according to claim 4 wherein the detectors in each detection circuit comprise semiconductor diodes.

8. The apparatus according to claim 4 further comprising indicator means for immediately warning a user that a tolerable radioactivity level has been exceeded.

9. The apparatus according to claim 1 wherein said counting means includes means for counting said pulses in an additive manner, independently of the counting time, the counting continuing in time until a given number of pulses is recorded by said counting means.

* * * * *